United States Patent
Ohnari et al.

(10) Patent No.: US 8,767,800 B2
(45) Date of Patent: Jul. 1, 2014

(54) PROTECTION RELAY DEVICE AND PROTECTION RELAY METHOD

(75) Inventors: Takaaki Ohnari, Fuchu (JP); Tomoyuki Kawasaki, Fuchu (JP); Katsuhiko Sekiguchi, Tama (JP); Shogo Miura, Tokyo (JP); Masayuki Kawamata, Sendai (JP)

(73) Assignees: Kabushiki Kaisha Toshiba, Tokyo (JP); Tohoku University, Miyagi (JP)

( * ) Notice: Subject to any disclaimer, the term of this patent is extended or adjusted under 35 U.S.C. 154(b) by 0 days.

(21) Appl. No.: 13/611,799

(22) Filed: Sep. 12, 2012

(65) Prior Publication Data

US 2013/0063205 A1   Mar. 14, 2013

Related U.S. Application Data

(63) Continuation of application No. PCT/JP2011/001508, filed on Mar. 15, 2011.

(30) Foreign Application Priority Data

Mar. 16, 2010   (JP) ................ P2010-058642

(51) Int. Cl.
   *H04B 1/10*   (2006.01)
(52) U.S. Cl.
   USPC ......................................................... 375/211
(58) Field of Classification Search
   USPC .................. 375/211, 213, 232, 316, 346, 350
   See application file for complete search history.

(56) References Cited

U.S. PATENT DOCUMENTS

| | | | |
|---|---|---|---|
| 4,041,783 A | 8/1977 | Shimauchi et al. | |
| 6,388,701 B1 * | 5/2002 | Lee | 348/21 |
| 8,331,430 B2 * | 12/2012 | Wang et al. | 375/224 |
| 8,364,076 B2 * | 1/2013 | Eum et al. | 455/24 |
| 2003/0228019 A1 * | 12/2003 | Eichler et al. | 381/71.8 |

FOREIGN PATENT DOCUMENTS

| | | |
|---|---|---|
| JP | 60-229618 A | 11/1985 |
| JP | 01-286721 A | 11/1989 |
| JP | 02-155417 A | 6/1990 |
| JP | 03-245717 A | 11/1991 |
| JP | 05-068321 A | 3/1993 |
| JP | 2000-295757 A | 10/2000 |
| JP | 2004-248477 A | 9/2004 |
| WO | WO 2007/135162 A1 | 11/2007 |

OTHER PUBLICATIONS

International Preliminary Report on Patentability (IPRP), and Written Opinion dated Mar. 15, 2011 (in English) issued in parent International Application No. PCT/JP2011/001508.
International Search Report dated May 17, 2011 in counterpart International Application No. PCT/JP2011/001508.

(Continued)

*Primary Examiner* — Khanh C Tran
(74) *Attorney, Agent, or Firm* — Holtz, Holtz, Goodman & Chick, P.C.

(57) ABSTRACT

A protection relay device includes: an analog-to-digital converter that samples an analog signal inputted from an analog input unit and converts the analog signal into digital data; a variable filter that filters and outputs the digital data, the variable filter having a filter coefficient that is varied by external control; and an adaptive controller that variably controls the filter coefficient of the variable filter so that a difference between the digital data filtered by the variable filter and a target signal decreases.

11 Claims, 7 Drawing Sheets

(56) References Cited

OTHER PUBLICATIONS

Japanese Office Action dated Jun. 18, 2013 (and English translation thereof) in counterpart Japanese Application No. 2010-058642.

Extended European Search Report (EESR) dated Nov. 26, 2013 (in English) in counterpart European Application No. 11755903.9.

Chinese Office Action dated Mar. 5, 2014 (and English translation thereof) in counterpart Chinese Application No. 201180013790.1.

* cited by examiner

PROTECTION RELAY DEVICE AND PROTECTION RELAY METHOD

CROSS-REFERENCE TO RELATED APPLICATIONS

This application is a continuation of prior International Application No. PCT/JP2011/001508 filed on Mar. 15, 2011, which is based upon and claims the benefit of priority from Japanese Patent Application No. 2010-058642 filed on Mar. 16, 2010; the entire contents of all of which are incorporated herein by reference.

FIELD

Embodiments described herein relate to a protection relay device and a protection relay method that protect an electric power system such as an electric power transmission line.

BACKGROUND

For example, a digital protection control measurement device for an electric power system converts a current or a voltage from an electric power system into digital data via a transformer (PCT: potential current transformer), an analog filter, and an analog-to-digital converter, performs an arithmetic operation on the digital data by software, and controls a breaker, an alarm device, or the like based on the arithmetic operation result.

In such a protection control measurement device that performs protection control on the electric power system, its measurement accuracy mainly depends on the input transformer (PCT), the analog filter, and the analog-to-digital converter (hereinafter, collectively referred to as "analog input unit"). In order to improve the performance of the protection control measurement device, the analog input unit has to have higher accuracy. In addition, the analog filter and the like are aged-deteriorated, and hence monitoring the aged deterioration at high accuracy is also necessary.

As a conventional technique of performing protection control on the electric power system, for example, a digital protection relay that performs over-sampling on digital data obtained by converting an analog signal in the analog input unit, and uses the data to reduce noise of the analog input unit has been proposed.

Further, as a monitoring method for the analog input unit, for example, a technique of monitoring superposed harmonics has been proposed.

In this monitoring method, in order to constantly monitor aged deterioration of components of the analog filter, a signal having a frequency equal to a frequency of a commercial electric power (50 Hz or 60 Hz) flowing through the electric power system is superimposed on an input to the analog filter and the magnitude, the phase, and the like thereof are monitored using software.

However, with the technique of a related art, the over-sampling accuracy depends on the performance of the analog-to-digital converter, and hence using a general-purpose converter causes a problem that the over-sampling accuracy may be too low to reduce the noise of the analog input unit.

Further, with the technique of a related art, the monitoring result has low reliability because the monitoring result largely depends on harmonics generating on the electric power system side.

Embodiments have been made in order to solve the above-mentioned problems and it is an object that to provide a protection relay device and a protection relay method that are capable of reducing noise generating in an analog input unit that receives a signal from an electric power system and also capable of monitoring aged deterioration of components of the analog input unit at high accuracy and reliability.

DETAILED DESCRIPTION

A protection relay device according to an embodiment includes: an analog input unit that outputs an analog signal representing a quantity of electricity of an electric power system; an analog-to-digital converter that samples the analog signal, which is inputted from the analog input unit, and converts the analog signal into digital data; a variable filter that filters and outputs the digital data converted by the analog-to-digital converter, the variable filter having a filter coefficient that is varied by external control; a target signal generator that generates a target signal corresponding to the analog signal; a difference calculator that calculates a difference between the digital data filtered by the variable coefficient filter and the target signal generated by the target signal generator; and an adaptive controller that variably controls the filter coefficient of the variable filter so that the difference calculated by the difference calculator decreases.

A protection relay method according to an embodiment includes the steps of: outputting, from an analog input unit, an analog signal representing a quantity of electricity of an electric power system; sampling the analog signal, which is inputted from the analog input unit into an analog-to-digital converter, and converting the analog signal into digital data; filtering and outputting, by a variable filter having a filter coefficient that is varied by external control, the digital data converted by the analog-to-digital converter; generating, by a target signal generator, a target signal corresponding to the analog signal; calculating, by a difference calculator, a difference between the digital data filtered by the variable coefficient filter and the target signal generated by the target signal generator; and variably controlling, by an adaptive controller, the filter coefficient of the variable filter so that the difference calculated by the difference calculator decreases.

According to the embodiments, it is possible to provide a protection relay device and a protection relay method that are capable of reducing noise generated in an analog input unit that receives a signal from an electric power system and also capable of monitoring aged deterioration of components of the analog input unit at high accuracy and reliability.

Figure 1:
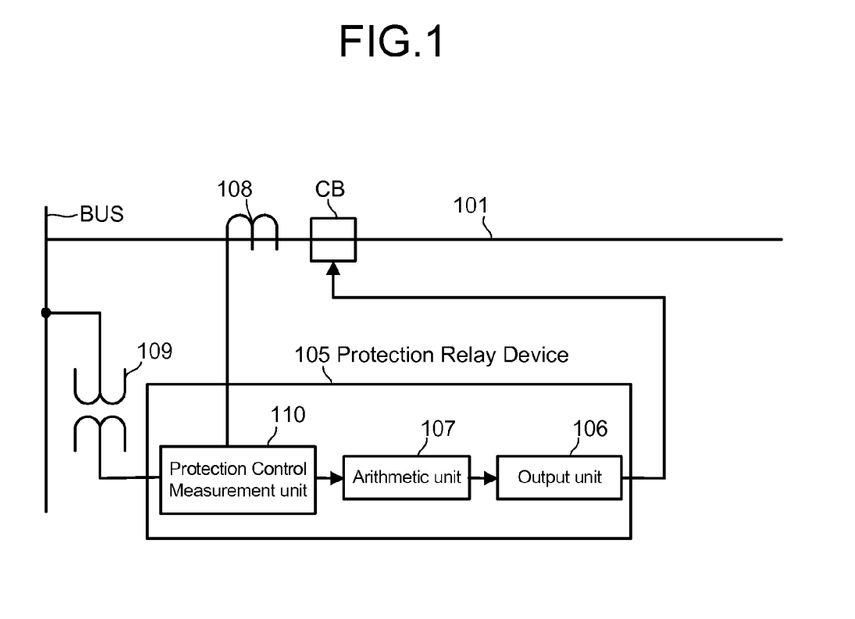
FIG. 1 is a diagram showing a schematic configuration of an electric power transmission system according to an embodiment.

Hereinafter, embodiments will be described in detail with reference to the drawings. FIG. 1 is a diagram showing a configuration of an electric power transmission system according to an embodiment.

First Embodiment

As shown in FIG. 1, this electric power transmission system includes: an electric power transmission line 101 and an electric power transformer of an electric power system; a breaker CB, a current transformer 108, and a metering voltage transformer 109 that are connected to the electric power transmission line 101; and a protection relay device 105. The protection relay device 105 receives and monitors analog signals (voltage signal and current signal) each indicating the amount of electric power that are detected by the current transformer 108 and the metering voltage transformer 109, respectively. During the occurrence of an abnormality, the protection relay device 105 performs protection control of breaking the electric power transmission on the breaker CB.

The protection relay device 105 includes a protection control measurement unit 110, an arithmetic unit 107, and an output unit 106. The protection control measurement unit 110 measures a voltage on the electric power transmission line 101 and a current flowing through the electric power transmission line 101 and transmits digital data for an arithmetic operation, noise of which has been removed, to the arithmetic unit 107.

The arithmetic unit 107 performs a logical arithmetic operation using the digital data inputted from the protection control measurement unit 110 and determines whether or not an abnormality occurs in the electric power system. When it is determined that the abnormality occurs, the output unit 106 outputs a control signal for opening the breaker CB and an abnormality alarm signal.

Figure 2:
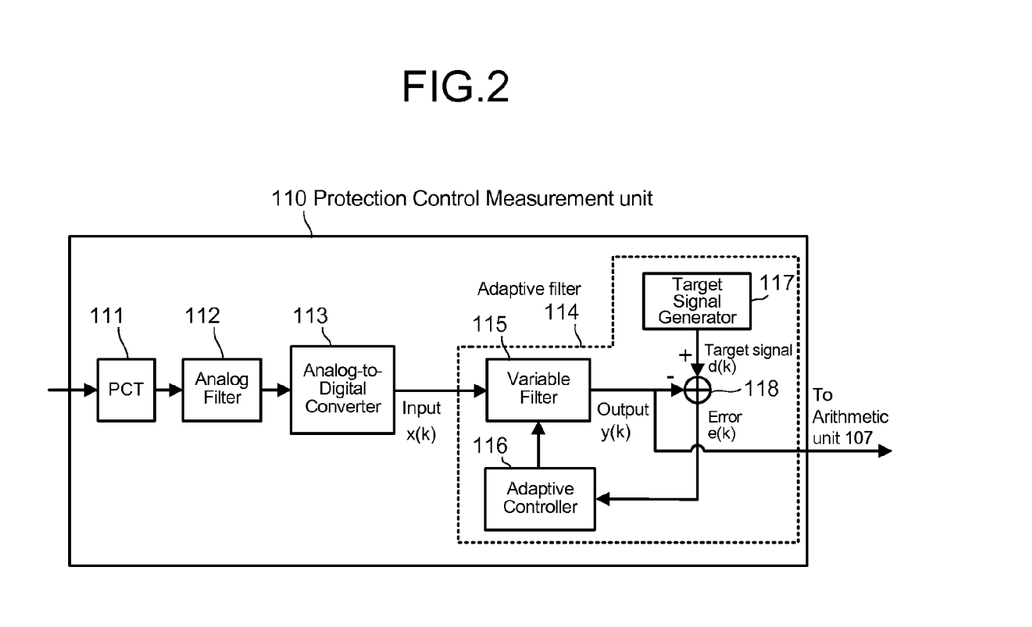
FIG. 2 is a block diagram showing a configuration of a protection control measurement unit according to a first embodiment.

As shown in FIG. 2, the protection control measurement unit 110 according to the first embodiment includes an input transformer 111 (hereinafter, referred to as "PCT 111"), an analog filter 112, an analog-to-digital converter 113, and an adaptive filter 114.

The PCT 111 proportionally distributes the voltage (current) from the electric power transmission line 101 in an operation state, to thereby reduce the voltage (current) to a voltage (current) that can be processed by this measurement unit. For example, a voltage of from approximately 60 V to 65 V is reduced to a voltage of from approximately 5 V to 10 V.

The analog filter 112 is a low-pass filter that suppresses an aliasing error (noise) or the like of a signal of a voltage (current) or the like received by the PCT 111. Thus, the analog filter 112 outputs an analog signal representing the quantity of electricity of the electric power system.

The analog-to-digital converter 113 samples the inputted analog signal and converts the analog signal into the digital data. Specifically, the analog-to-digital converter 113 converts the analog signal (filtered analog signal), noise of which has been suppressed by the analog filter 112, into the digital data and outputs the digital data.

The adaptive filter 114 is provided at a subsequent stage of the analog-to-digital converter 113. The adaptive filter 114 includes a variable filter 115, an adaptive controller 116, a target signal generator 117, a difference calculator 118, etc.

Figure 3:
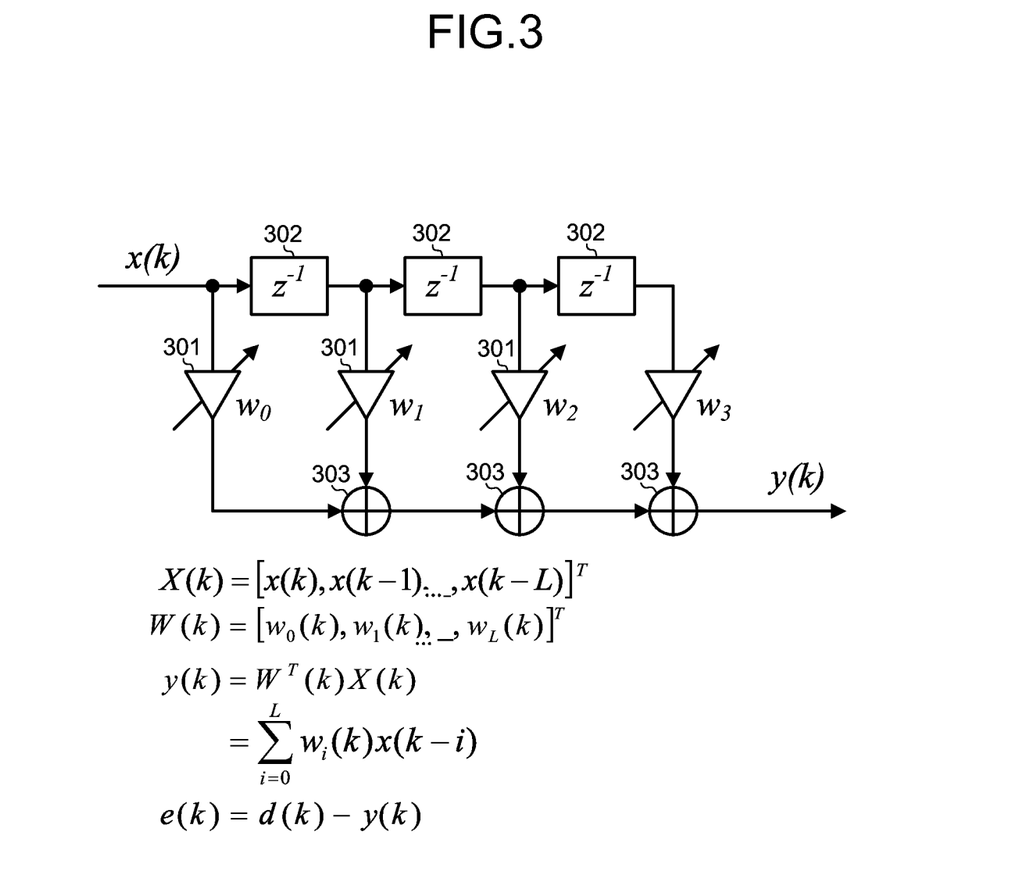
FIG. 3 is a diagram showing an example of a variable coefficient filter.

As shown in FIG. 3, the variable filter 115 includes variable coefficient filters 301 that filter an input signal (digital data) x(k) outputted from the analog-to-digital converter 113, a plurality of delay elements 302 each having a predetermined tap coefficient $Z^{-1}$, and adders 303. Each of the variable coefficient filters 301 has a variable filter coefficient w(k) (k is integer of 0, 1, 2, 3 . . . ).

The adaptive controller 116 controls the variable filter coefficient w(k) of each of the variable coefficient filters 301 and the variable filter 115 outputs output data y(k) to the difference calculator 118. In other words, the filter coefficient is adjusted (varied) by external control (control by adaptive controller 116) and the variable filter 115 filters and outputs the digital data converted by the analog-to-digital converter 113.

The target signal generator 117 generates, with respect to the input signal, an ideal target signal (converged target) having no noise and distortion, in this case, a transfer function d(k) of a sine wave. In other words, the target signal generator 117 generates the target signal corresponding to the analog signal.

The difference calculator 118 calculates an error e(k) between the input signal (digital data) x(k) and the target signal d(k) and outputs the error e(k) to the adaptive controller 116. In other words, the difference calculator 118 calculates a difference between the digital data x(k) filtered by the variable filter 115 and the target signal d(k) generated by the target signal generator 117 and outputs the difference to the adaptive controller 116.

The difference calculator 118 calculates a difference between the target signal d(k) generated by the target signal generator 117 and the output data y(k), as an error e(k), and inputs one obtained by squaring the error e(k) in order to eliminate influences of signs, that is, an error $e^2(k)$ into the adaptive controller 116.

In accordance with an adaptive algorithm provided in advance, the adaptive controller 116 adjusts (variably controls) the variable filter coefficient w(k) of each of the variable coefficient filters 301 so that an error $e^2(k)$ between the input signal (digital data) x(k) and the target signal d(k) becomes minimum. As the adaptive algorithm, for example, an LMS (least-mean-squares) algorithm is used.

As the target signal d(k), a sine wave shown by (Expression 1) below is used. Although a current flowing through the electric power transmission line 101, the electric power transformer, and the like is, for example, a sine wave having a fundamental frequency of from 50 Hz or 60 Hz in Japan, (Expression 1) below is applicable even if the frequency is different from the fundamental frequency.

$$A_0 \sin\left(2\pi \frac{f_0}{f_s} n + \theta_0\right) \qquad \text{(Expression 1)}$$

Next, an operation of the electric power transmission system will be described. In this electric power transmission system, a voltage on the electric power transmission line 101 and a current flowing through the electric power transmission line 101 are measured by the protection control measurement unit 110 and digital data for an arithmetic operation, noise of which has been removed, is transmitted to the arithmetic unit 107.

The arithmetic unit 107 performs a logical arithmetic operation using the digital data inputted from the protection control measurement unit 110 and determines whether or not an abnormality occurs in the electric power system.

When it is determined that the abnormality occurs, the output unit 106 outputs a control signal to the breaker CB for stopping the electric power transmission. At the same time, the output unit 106 outputs an abnormality alarm signal to a monitoring panel or the like in a monitoring room, to thereby informs a monitor (user) or the like of the abnormality in the electric power system.

Here, the electric power transmission is performed on the electric power transmission line 101 with various types of noise being imposed thereon. Therefore, in the protection control measurement unit 110, no correct determinations can be made without removing the noise from the input signal being a measurement target while determining a state of the signal.

Figure 4:
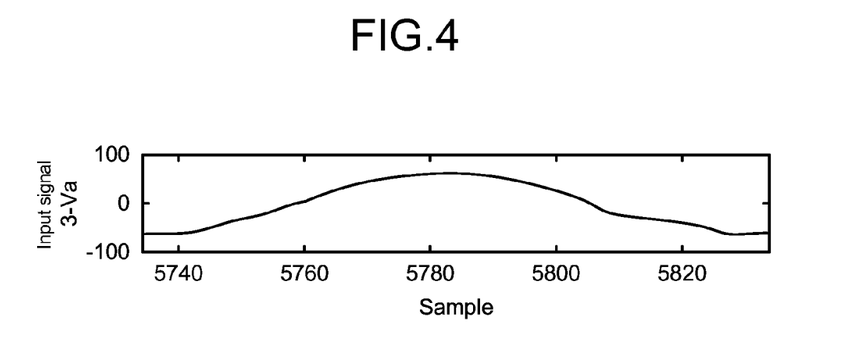
FIG. 4 is a diagram of a waveform of an input signal.
Figure 5:
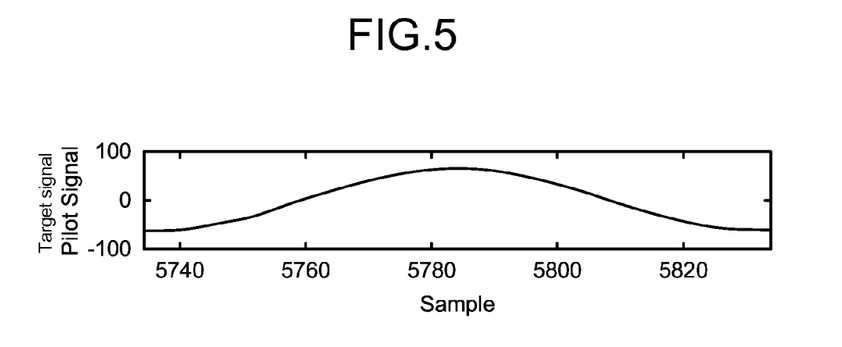
FIG. 5 is a diagram of a waveform of a target signal.

In this context, when the adaptive filter 114 is provided at the subsequent stage of the analog-to-digital converter 113 of the protection control measurement unit 110 of the protection relay device 105 and the input signal is inputted as shown in FIG. 4, the difference calculator 118 in the adaptive filter 114 calculates an error (difference) between an input signal from the electric power transmission line 101 and a target signal shown in FIG. 5 and transmits the error (difference) to the adaptive controller 116. Then, the adaptive controller 116 controls the variable filter 115 so that the error (difference) becomes minimum. In this manner, the output signal shown in FIG. 6 is obtained.

Figure 6:
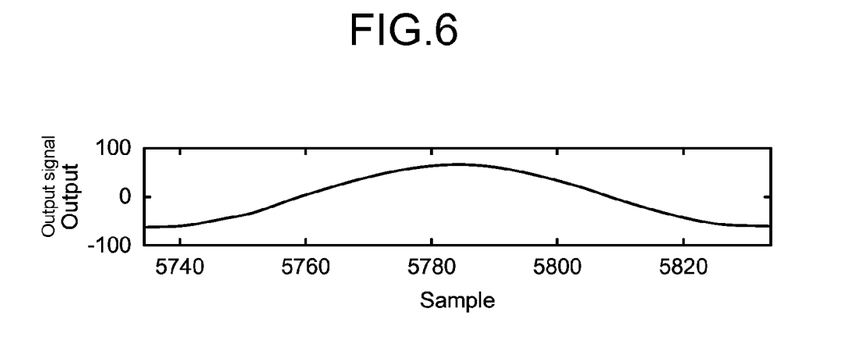
FIG. 6 is a diagram showing an output signal.

It can be seen from a waveform of the output signal shown in FIG. 6 that, as a result when the adaptive controller 116 controls a filter coefficient of the variable filter 115, a non-linear error generated in the PCT 111, white noise such as thermal noise generated around the analog filter 112, noise induced by an electric power supply line or the like, a quantisation error generated in, for example, the analog-to-digital converter 113, etc. are reduced by the adaptive filter 114.

Figure 7:
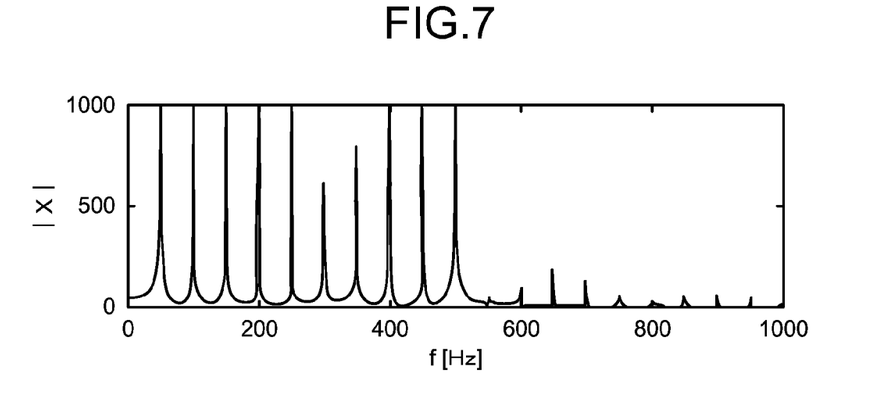
FIG. 7 is a diagram showing a spectrum of the waveform of the input signal in FIG. 4.
Figure 8:
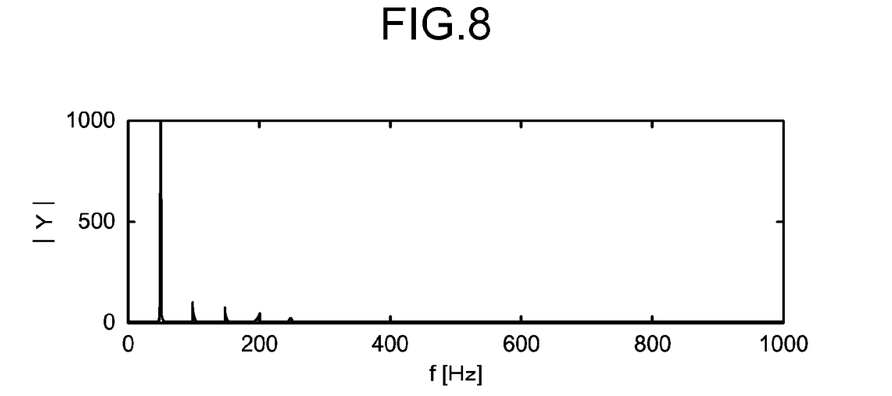
FIG. 8 is a diagram showing a spectrum of the waveform of the output signal in FIG. 6.

Further, FIG. 7 shows a spectrum of a waveform of the input signal in FIG. 4 and FIG. 8 shows a spectrum of a waveform of the output signal in FIG. 6. Comparing those spectra with each other, it can be seen that the noise is uniformly reduced in a frequency bandwidth other than the fundamental frequency and frequencies around the fundamental frequency.

Thus, according to the electric power transmission system of the first embodiment, by providing the adaptive filter 114 at the subsequent stage of the analog-to-digital converter 113 and adjusting/controlling the filter coefficient so that the error of the input signal becomes minimum with the function of (Expression 1) being as the target signal, it is possible to significantly reduce the noise of the analog input unit. Further, by using the output signal filtered by the adaptive filter 114 for a determination of whether or not the abnormality occurs in the electric power system, it is possible to provide a highly accurate protection relay device.

Specifically, functions having different input dynamic ranges such as a protection arithmetic operation function and a metering function of a distance relay or the like are provided in a single device and the respective functions have high input accuracy, and hence it is possible to provide a protection relay device that is excellent in economy and reliability.

As a result, it is possible to reduce noise such as white noise and external noise of the analog input unit and distortion due to non-linearity of the PCT and to monitor aged changes of the analog input unit at high accuracy and reliability.

Second Embodiment

Next, referring to FIGS. 9 and 10, a second embodiment will be described. In the first embodiment, by constantly operating the adaptive filter 114, the value of the output signal is converged to an optimal value for reducing noise. However, in the case where it is a main objective to monitor changes over time of the components, the constant operation of the adaptive filter 114 is unnecessary.

Therefore, in the second embodiment, an example of stopping an adaptive operation of the adaptive filter 114 after a predetermined time period has elapsed (fixing filter coefficients after predetermined time period has elapsed) will be described.

In this case, a predetermined threshold range (range of thresholds having lower limit and upper limit) is stored on a memory or the like in advance, and then the adaptive controller 116 fixes a coefficient of each of the variable coefficient filters 301 under a condition that the output of the variable coefficient filter 301 with respect to the target signal falls within the predetermined threshold range. It should be noted that the filter coefficients of the variable coefficient filters 301 may be fixed under a condition that the error (difference) inputted from the difference calculator 118 falls within a predetermined range.

Typically, the adaptive controller 116 performs an arithmetic operation for calculating an optimal variable filter coefficient $w(k)$. Then, the variable filter coefficient $w(k)$ of each of the variable coefficient filters 301 is adjusted so that the error $e(k)$ becomes minimum.

Then, the adaptive controller 116 stops the adaptive control based on the fact that the error $e(k)$ becomes smaller than a threshold $e(s)$ set in advance and coefficients $w(0), w(1), w(2)$ . . . at this time are fixed as coefficients of the variable coefficient filters 301 after that time. Spectra of an input/output waveform that are calculated with the variable filter coefficients being fixed are shown in FIGS. 9 and 10.

Figure 9:
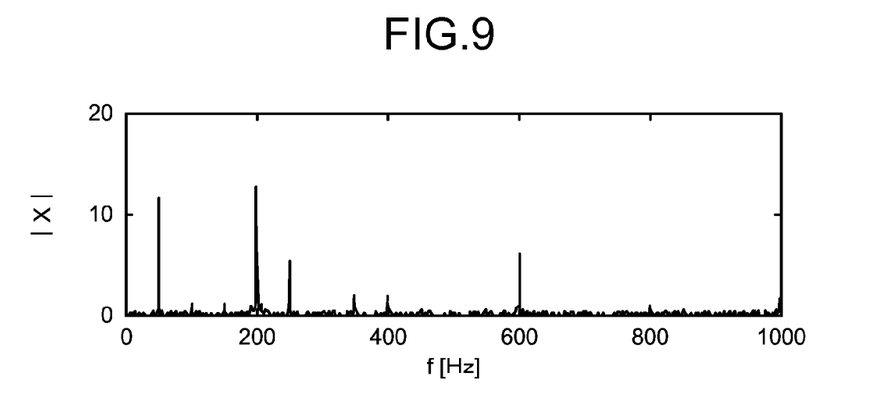
FIG. 9 is a diagram showing a spectrum of a waveform of an input signal in a second embodiment.
Figure 10:
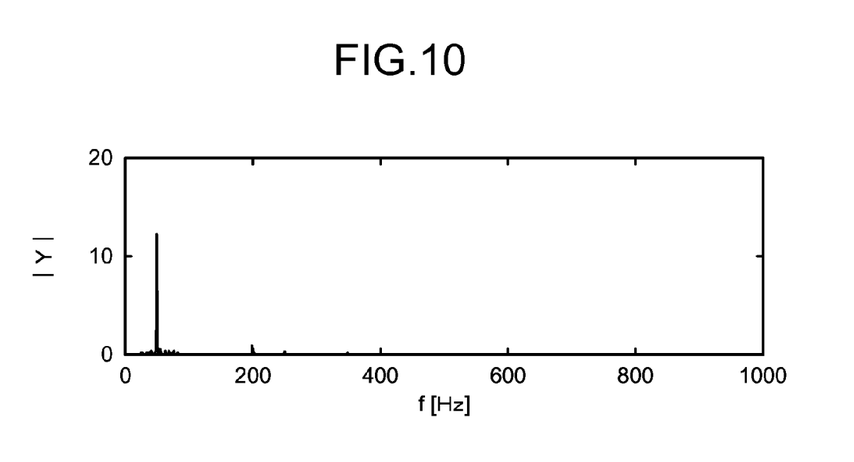
FIG. 10 is a diagram showing a spectrum of a waveform of an output signal in the second embodiment.

Some degree of noise is imposed on the spectrum of the waveform of the input signal in FIG. 9. Even if the variable filter coefficients of the variable coefficient filters 301 are fixed after a predetermined time period has elapsed, the spectrum as shown in FIG. 10 is obtained. Therefore, it can be seen that noise is suppressed as much as the noise of the spectrum obtained by constantly adjusting/controlling the filter coefficients that is shown in FIG. 8.

The adaptive filter 114 needs to calculate the difference between the input waveform and the target signal. However, after a certain observation time period has elapsed, the coefficients of the variable coefficient filters 301 tend to be substantially converged to a certain value. That means that the coefficient for adapting for properties of each analog input unit to reduce inherent noise has been obtained.

According to the second embodiment, the protection relay device 105 starts to operate, causes the adaptive controller 116 to operate to calculate a variable filter coefficient of the variable filter 115 for a certain time period, and thereafter fixes the variable filter coefficient. In this manner, the noise reduction effect is obtained as in the first embodiment. Further, the adaptive control is stopped after the device started to operate and the predetermined time period has elapsed, and hence arithmetic operation load of the device can be reduced. Thus, it is possible to provide a highly economic protection relay device 105.

Third Embodiment

Next, a third embodiment will be described. In the third embodiment, the adaptive controller 116 monitors changes over time of variable coefficient vectors, and determines, when the changes depart from a predetermined reference range or show a predetermined change state, that an abnormality occurs in the protection relay device 105.

In other words, the adaptive controller 116 monitors a change over time of a signal outputted from the variable filter 115 and determines, when a change value of the output signal that changes due to the change over time departs from a predetermined threshold range or an output pattern that changes due to the change over time matches or becomes similar to a predetermined change pattern, that an abnormality occurs in the protection relay device 105.

Figure 11:
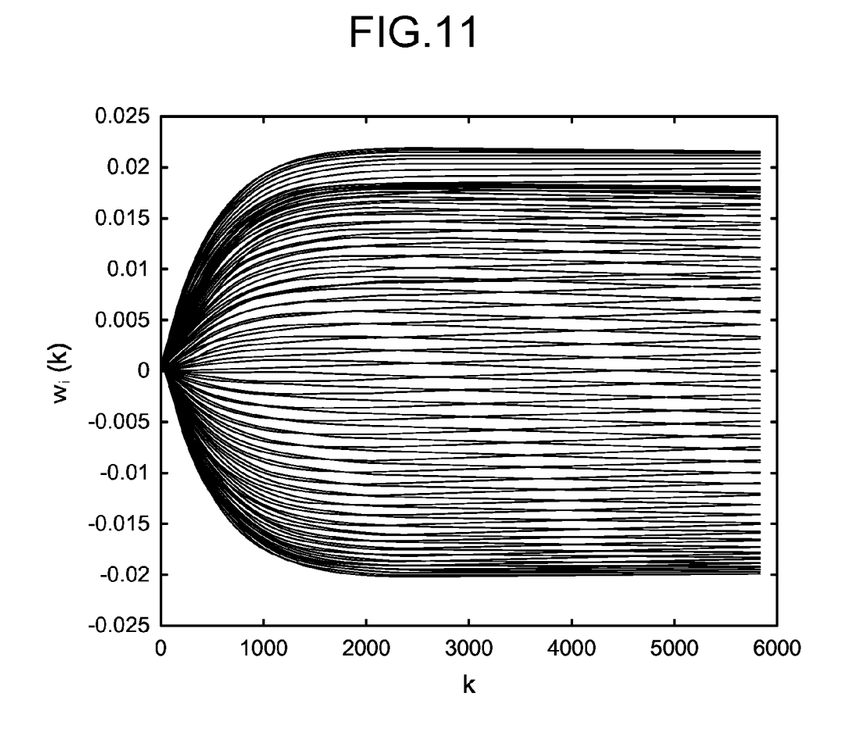
FIG. 11 is a diagram showing a state of a variable filter coefficient $w_1(k)$ varying as a time period k elapses in a third embodiment.

As in the second embodiment, after the system starts to operate so that the adaptive filter 114 is operated, as shown in FIG. 11, as a time period k elapses after the start of the adaptive operation, coefficients $w_i(k)$ of the variable coefficient filters 301 are each converged to a certain value. When a certain time period k has elapsed, it becomes possible to calculate optimal coefficients $w_i(k)$ of the variable coefficient filters 301.

The adaptive controller 116 performs constant monitoring of the analog input unit, in which this coefficient value is compared with a level of the input signal to determine whether or not the level of the input signal departs from the predetermined reference range that is set in advance with respect to the coefficient value.

As a specific example, the optimal coefficients $w_0(s)$, $w_1(s)$, and $w_2(s)$, ... that have been calculated in the above-mentioned manner are compared with coefficients $w_0(k)$, $w_1(k)$, and $w_2(k)$, ... that are constantly calculated by the adaptive algorithm by using (Expression 2) below.

$$\sum_{i=0}^{m} a_i(w_i(k) - w_i(s))^2 \rangle \varepsilon \quad \text{(Expression 2)}$$

When (Expression 2) above is satisfied, the adaptive controller 116 determines that aged deterioration occurs in the analog input unit, and outputs an alarm about the fact that the aged deterioration occurs. As the alarm, for example, a buzzer sound is outputted or a message for informing the monitoring panel or the like is sent. Further, with the output of the alarm, the protection relay device 105 itself may be controlled to stop.

According to the third embodiment, it is possible to perform highly accurate monitoring even without superimposition of harmonics as in the conventional monitoring method for the analog input unit and hardware for the superimposition becomes also unnecessary. Thus, it is possible to provide a protection relay device that is excellent in economy and reliability.

Fourth Embodiment

Figure 12:
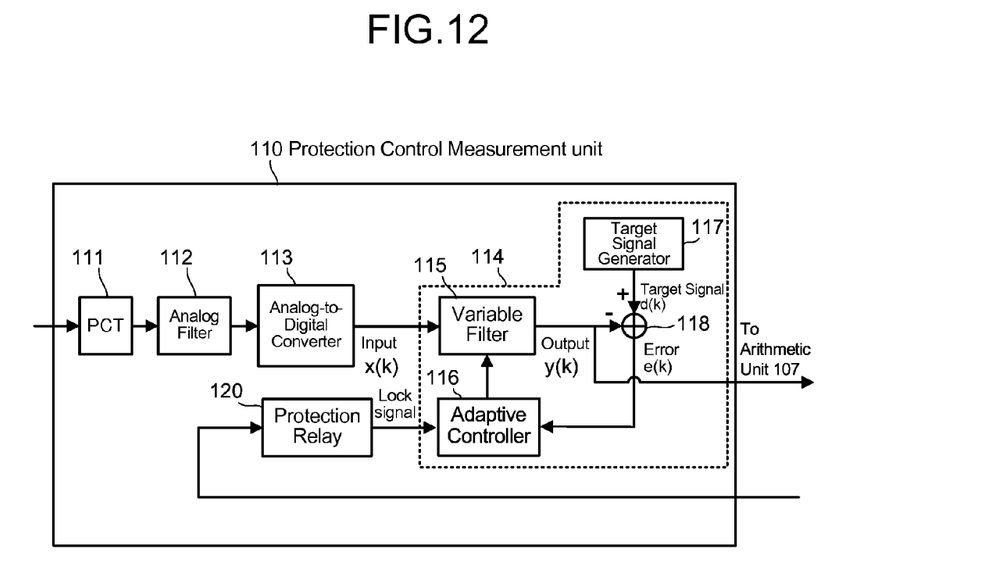
FIG. 12 is a block diagram showing a configuration of a protection control measurement unit according to a fourth embodiment.

Referring to FIG. 12, a fourth embodiment will be described. In the fourth embodiment, an adaptive control operation is stopped during the occurrence of an accident in the electric power system. Although, in the first embodiment, the target signal of the adaptive filter 114 is the sine wave (fixed signal), here, when a signal significantly different from the sine wave is inputted as the input signal, this signal and the sine wave are compared with each other, and the adaptive filter 114 is driven so that the difference becomes minimum, the variable filter coefficient is significantly fluctuated. However, for reducing the error of the analog input unit and monitoring the aged deterioration, the significant fluctuation of the filter coefficient is undesirable.

Such a signal significantly different from the sine wave is often inputted during the occurrence of an accident in the electric power system. In view of this, as shown in FIG. 12, for example, a relay operation signal outputted from a protection relay 120 is received by the adaptive controller 116 and the adaptive controller 116 stops or locks an adaptive control operation when the relay operation signal is inputted.

In other words, when receiving the relay operation signal from the protection relay 120 that operates during the occurrence of an accident in the electric power system, the adaptive controller 116 stops the adaptive operation on the variable filter 115.

According to the fourth embodiment, the relay operation signal outputted from the protection relay 120 is received by the adaptive controller 116 and the adaptive control operation is locked, and hence the variable filter 115 of the adaptive filter 114 is not adjusted to have an incorrect filter coefficient when the protection relay 120 operates. Thus, it is possible to provide a highly reliable protection relay device 105.

Fifth Embodiment

Figure 13:
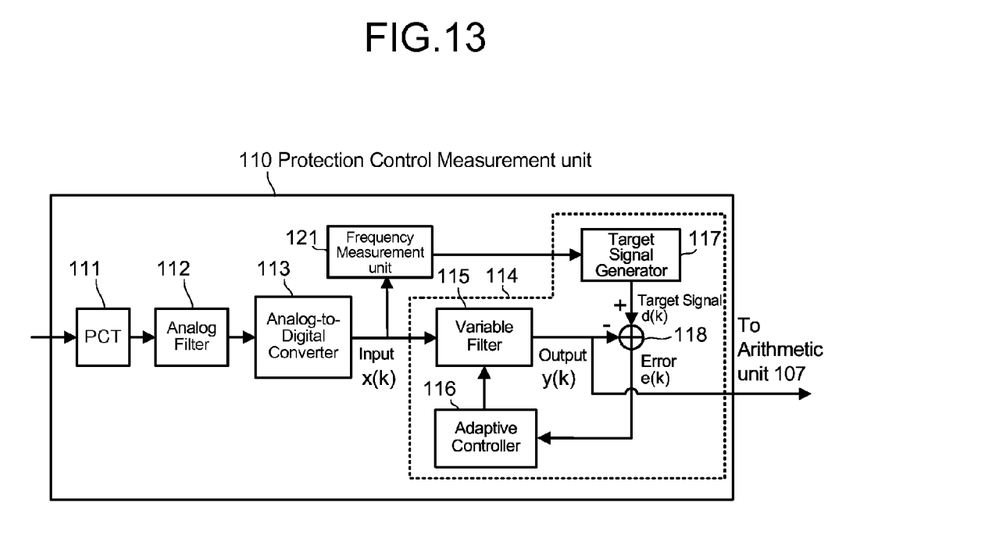
FIG. 13 is a block diagram showing a configuration of a protection control measurement unit according to a fifth embodiment.
Figure 14:
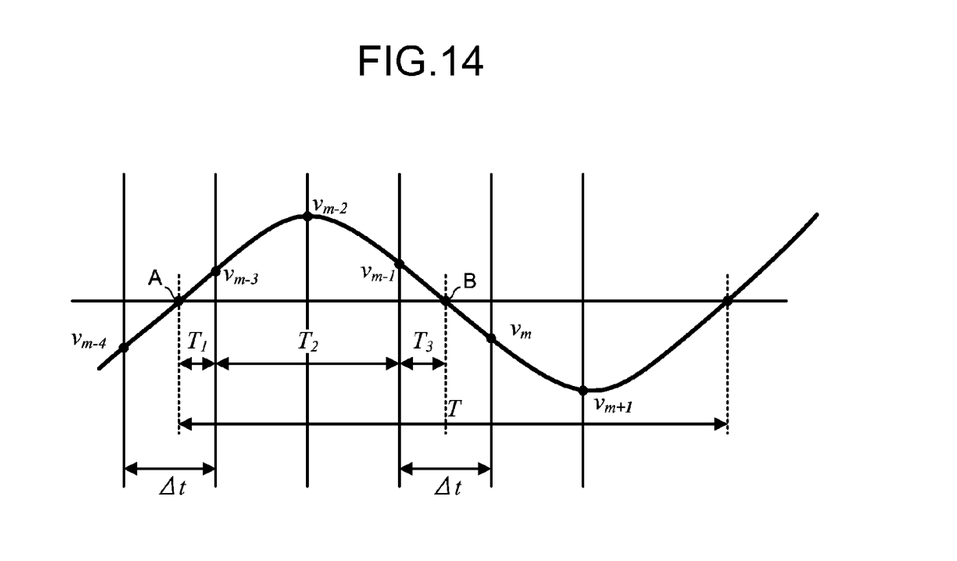
FIG. 14 is a diagram explaining how to calculate, by a linear approximation, time intervals between zero cross points and sampled points after/before zero cross points of a voltage waveform.

Referring to FIGS. 13 and 14, a fifth embodiment will be described. In the fifth embodiment, as shown in FIG. 13, a frequency measurement unit 121 is provided at a subsequent stage of the analog-to-digital converter 113 and a frequency of the input signal x(k) that is obtained from the electric power system is measured.

Further, the target signal generator 117 corrects the frequency of the sine wave being the target signal by using the frequency measured by the frequency measurement unit 121. In other words, the target signal generator 117 generates the target signal based on the frequency measured by the frequency measurement unit 121.

Although the target signal of the adaptive filter 114 is shown by (Expression 1), in the first embodiment, the target signal is fixed to the value equal to the frequency of the commercial electric power (50 Hz or 60 Hz).

However, in the actual electric power system, in some cases, an input signal having a frequency slightly different from the frequency of the commercial electric power is used. In such cases, it is necessary to prevent the coefficient of the variable filter 115 from being inappropriately controlled.

Therefore, in the fifth embodiment, a signal x(k) outputted from the analog-to-digital converter 113 is branched and inputted into the adaptive filter 114 and the frequency measurement unit 121. In the frequency measurement unit 121, the frequency of the input signal x(k) is measured, a frequency for the target signal is calculated using the measured frequency in (Expression 1), and the target signal having the calculated frequency is generated by the target signal generator 117.

With this, even if the frequency is different from the frequency of the commercial electric power, an appropriate variable filter coefficient is obtained. Thus, it is possible to provide a highly reliable protection relay device. It should be noted that as an frequency measurement algorithm in the frequency measurement unit 121, for example, (Expression 3) below is applied.

$$T_1 = \frac{V_{m-3}}{V_{m-3} - V_{m-4}} \times \Delta t \quad \text{(Expression 3)}$$

$$T_3 = \frac{V_{m-1}}{V_{m-1} - V_m} \times \Delta t$$

$$T_2 = n \times \Delta t$$

$$T = (T_1 + T_2 + T_3) \times 2$$

Using sampled voltage data, the frequency measurement unit 121 calculates, as shown in FIG. 14, time intervals between zero cross points A and B and sampled points ($V_{m-3}$, $V_{m-1}$) after/before the zero cross points A and B of a voltage waveform (time interval $T_1$ between zero cross point A and sampled point $V_{m-3}$ after zero cross point A and time interval $T_3$ between zero cross point B and sampled point $V_{m-1}$ before zero cross point B) by a linear approximation, respectively. Then, a time interval ($T_2$) of data, which has an unchanged polarity, is added to the calculated time interval $V_1$ and time interval $V_3$ to obtain a semi-time period ($T_1+T_2+T_3$). Then, the semi-time period ($T_1+T_2+T_3$) is doubled to obtain a time period (($T_1+T_2+T_3$)×2). Thus, the frequency is calculated.

Sixth Embodiment

Figure 15:
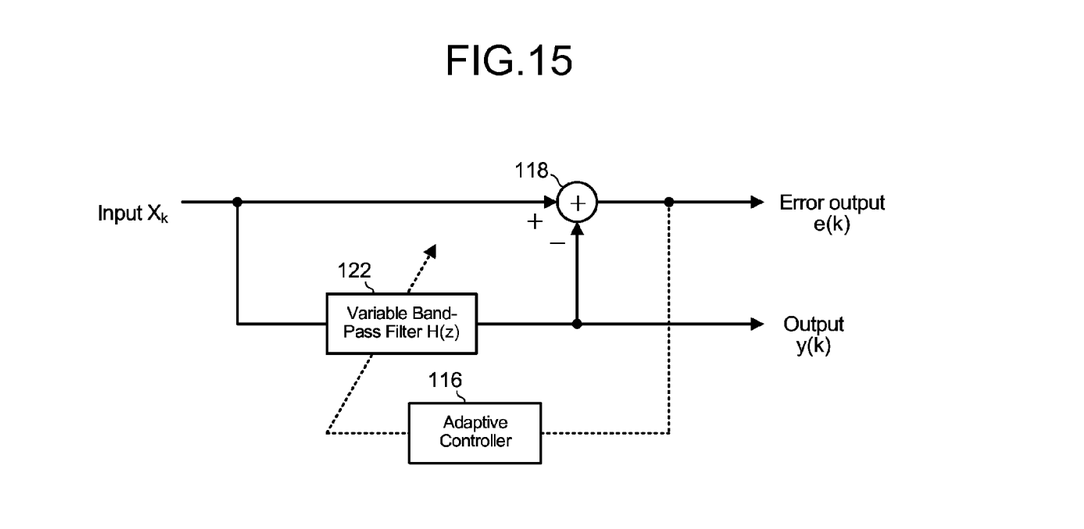
FIG. 15 is a diagram showing a sixth embodiment.

Referring to FIG. 15, a sixth embodiment will be described. In the sixth embodiment, as the frequency measurement unit 121 of the fifth embodiment, a variable band-pass filter 122 as shown in FIG. 15 is used.

Regarding the variable band-pass filter 122, a cut-off frequency, a bandwidth, the amount of attenuation, and the like can be varied by varying a parameter of the filter. For example, a frequency conversion T(z) is performed on a transfer function H(z) of a digital filter having predetermined properties, to thereby obtain a transfer function H'(z) of each of the variable coefficient filters 301.

Provided that a function for performing the frequency conversion T(z) is expressed by (Expression 4) below;

$$T(z) = -z^{-1} \frac{z^{-1} - \alpha}{1 - \alpha z^{-1}}, \quad \text{(Expression 4)}$$

$$\alpha = \cos \omega_0$$

the transfer function of the variable band-pass filter 122 is obtained. It should be noted that, in (Expression 4) above, α indicates a variable parameter of the variable band-pass filter 122 and $\omega_0$ indicates a center frequency. This parameter is adaptively updated by the variable band-pass filter 122.

According to the sixth embodiment, by using the variable band-pass filter 122 as the frequency measurement unit 121 so that the variable band-pass filter 122 adaptively updates the parameter, it is possible to measure the frequency of the input signal containing noise at high accuracy. Thus, it is possible to provide a highly reliable protection relay device by applying the variable band-pass filter 122 to the frequency measurement unit 121.

It should be noted that the present invention is not limited only to the above-mentioned embodiments and the components may be, in practice, modified without departing from the gist of the present invention. For example, the components may be realized by a program installed in storage such as a hard disk device of a computer. Alternatively, the program may be stored on a computer-readable electronic medium in advance and the computer may realize the functions of the present invention by reading the program from the electronic medium.

Examples of the electronic medium include a recording medium such as a CD-ROM (compact disk read only memory), a flash memory, and a removable medium. Moreover, the present invention may be realized in such a manner that the components may be distributed and stored to/on different computers connected to each other over a network and the computers that execute the function of the component communicate with each other.

Moreover, the present invention may be realized in such a manner that the respective components may be distributed and stored to/on different computers connected to each other over a network and the computers that execute the functions of the respective components communicate with each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A protection relay method, comprising:
outputting an analog signal representing a quantity of electricity of an electric power system from an analog input unit;
sampling the analog signal inputted from the analog input unit into an analog-to-digital converter to convert the analog signal into digital data;
filtering the digital data converted by the analog-to-digital converter with a variable filter having a filter coefficient varied by external control;
generating a target signal corresponding to the analog signal with a target signal generator;
calculating a difference between the digital data filtered by the variable filter and the target signal generated by the target signal generator, with a difference calculator;
variably controlling the filter coefficient of the variable filter with an adaptive controller to decrease the difference calculated by the difference calculator; and
stopping an adaptive operation for the variable filter with the adaptive controller when receiving a signal from a protection relay configured to operate upon an occurrence of an accident in the electric power system.

2. A protection relay device, comprising:
an analog input unit configured to output an analog signal representing a quantity of electricity of an electric power system;
an analog-to-digital converter configured to sample the analog signal inputted from the analog input unit to convert the analog signal into digital data;
a variable filter configured to filter the digital data converted by the analog-to-digital converter, the variable filter having a filter coefficient varied by external control;
a target signal generator configured to generate a target signal corresponding to the analog signal;

a difference calculator configured to calculate a difference between the digital data filtered by the variable filter and the target signal generated by the target signal generator; and an adaptive controller configured to variably control the filter coefficient of the variable filter to decrease the difference calculated by the difference calculator, wherein the adaptive controller stops an adaptive operation for the variable filter when receiving a signal from a protection relay configured to operate upon an occurrence of an accident in the electric power system.

3. The protection relay device according to claim 2, further comprising a frequency measurement unit configured to measure a frequency of the analog signal obtained from the electric power system, wherein the target signal generator generates the target signal based on the frequency measured by the frequency measurement unit.

4. The protection relay device according to claim 3, wherein the frequency measurement unit includes a variable band-pass filter.

5. The protection relay device according to claim 2, wherein the adaptive controller fixes the filter coefficient of the variable filter under a condition of the difference falling within a predetermined range.

6. The protection relay device according to claim 2, wherein the adaptive controller monitors a change over time of a signal outputted from the variable filter to determine an occurrence of an abnormality, when a value of change of the output signal changing due to the change over time departs from a predetermined threshold range or when an output pattern changing due to the change over time corresponds to or becomes similar to a predetermined change pattern.

7. A protection relay device, comprising:
an analog input unit configured to output an analog signal representing a quantity of electricity of an electric power system;
an analog-to-digital converter configured to sample the analog signal inputted from the analog input unit to convert the analog signal into digital data;
a variable filter configured to filter the digital data converted by the analog-to-digital converter, the variable filter having a filter coefficient varied by external control;
a target signal generator configured to generate a target signal corresponding to the analog signal;
a difference calculator configured to calculate a difference between the digital data filtered by the variable filter and the target signal generated by the target signal generator;
an adaptive controller configured to variably control the filter coefficient of the variable filter to decrease the difference calculated by the difference calculator; and
a frequency measurement unit configured to measure a frequency of the analog signal obtained from the electric power system,
wherein the target signal generator generates the target signal based on the frequency measured by the frequency measurement unit.

8. The protection relay device according to claim 7, wherein the adaptive controller fixes the filter coefficient of the variable filter under a condition of the difference falling within a predetermined range.

9. The protection relay device according to claim 7, wherein the adaptive controller monitors a change over time of a signal outputted from the variable filter to determine an occurrence of an abnormality, when a value of change of the output signal changing due to the change over time departs from a predetermined threshold range or when an output pattern changing due to the change over time corresponds to or becomes similar to a predetermined change pattern.

10. The protection relay device according to claim 7, wherein the adaptive controller stops an adaptive operation for the variable filter when receiving a signal from a protection relay configured to operate upon an occurrence of an accident in the electric power system.

11. The protection relay device according to claim 7, wherein the frequency measurement unit includes a variable band-pass filter.

* * * * *